June 7, 1932. J. HALTENBERGER 1,861,440
SLEEVE VALVE ENGINE
Filed April 16, 1926 2 Sheets-Sheet 1
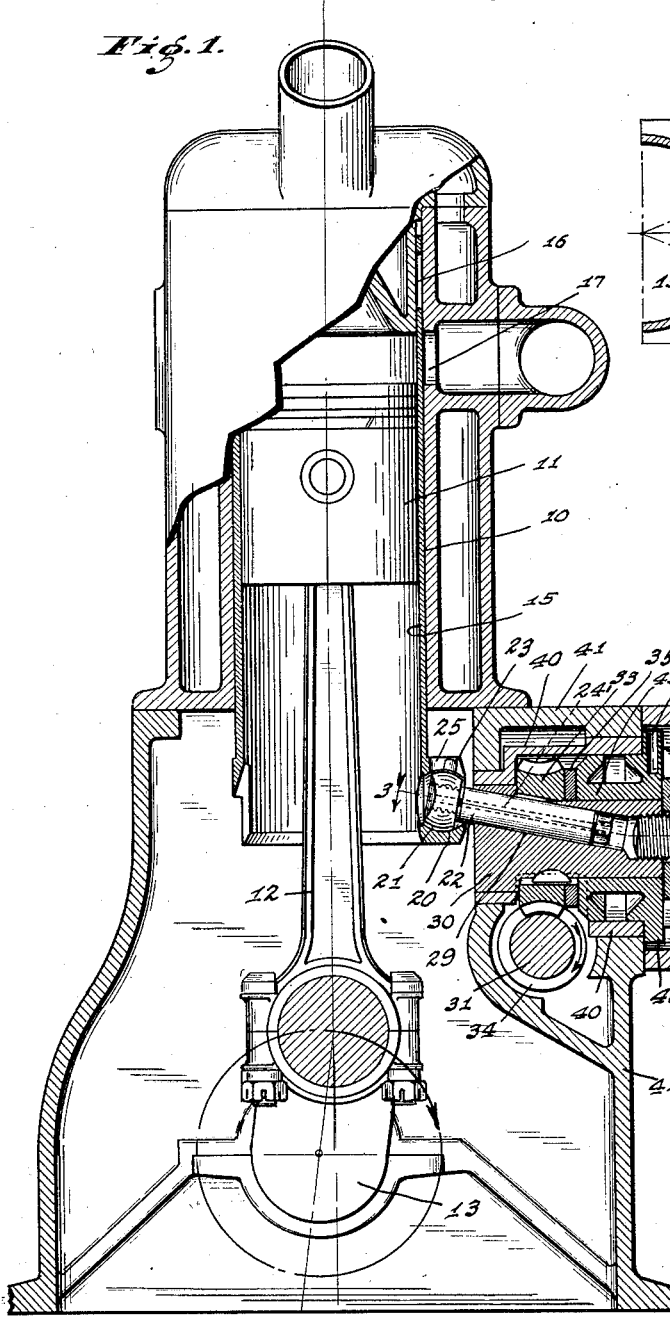
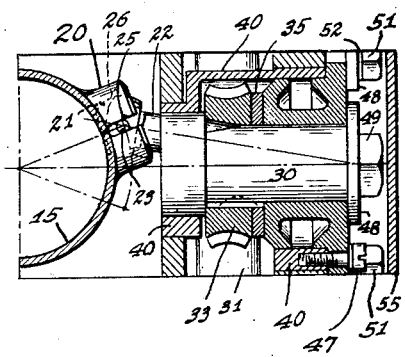
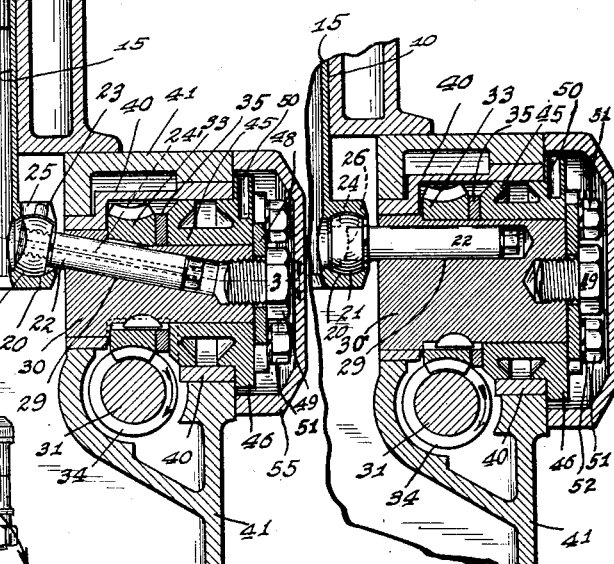
Inventor
JULES HALTENBERGER,
By Geo. B. Schley.
Attorney June 7, 1932.    J. HALTENBERGER    1,861,440
SLEEVE VALVE ENGINE
Filed April 16, 1926    2 Sheets-Sheet 2
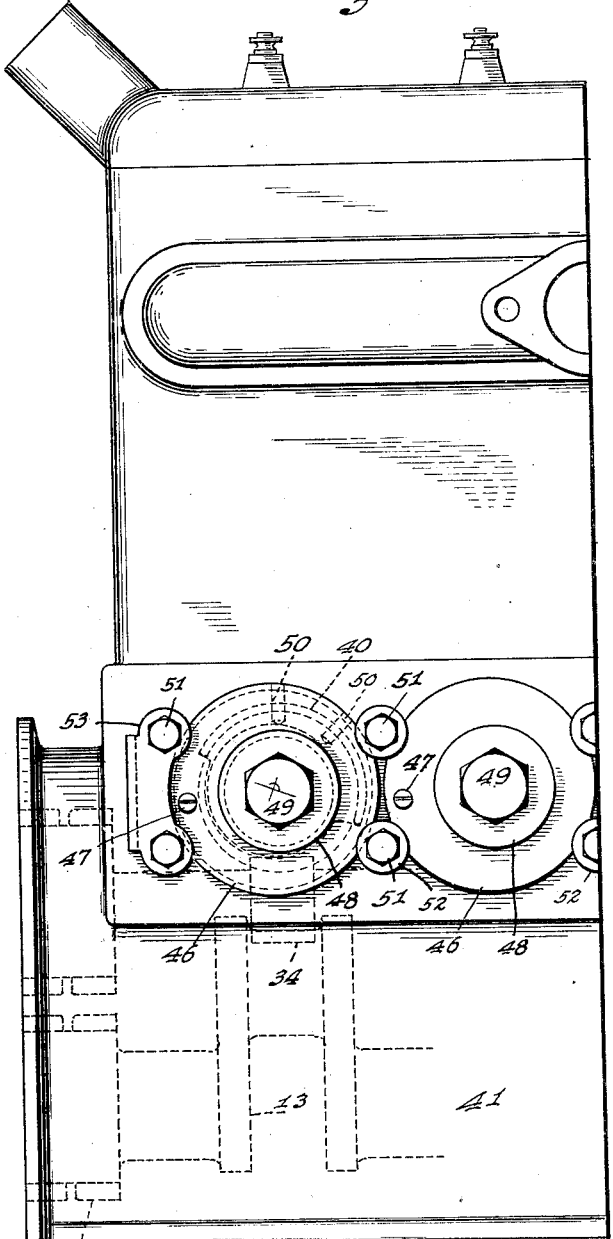
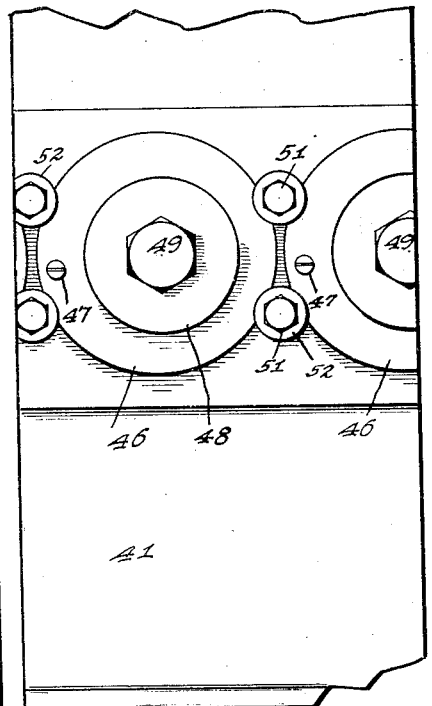
Inventor
JULES HALTENBERGER,
By G. B. Schley.
Attorney Patented June 7, 1932

1,861,440

UNITED STATES PATENT OFFICE

JULES HALTENBERGER, OF INDIANAPOLIS, INDIANA, ASSIGNOR, BY MESNE ASSIGNMENTS, TO CONTINENTAL MOTORS CORPORATION, OF DETROIT, MICHIGAN, A CORPORATION OF VIRGINIA

SLEEVE VALVE ENGINE

Application filed April 16, 1926. Serial No. 102,453.

It is the object of my invention to provide an efficient driving mechanism for the sleeve-valve of a single-sleeve-valve internal combustion engine, which driving mechanism is effective to withstand wear, is readily adjustable to compensate for wear, is conveniently put together and taken apart, and is readily adapted for reducing the size of the parts and for increasing the extent of circumferential oscillation with respect to the height of axial reciprocation of the sleeve-valve.

As is well known, the sleeve-valve of a single-sleeve-valve engine has a composite motion made up of axial reciprocation and circumferential oscillation. This is in order to produce the desired opening and closing of both the inlet ports and the exhaust ports by the movement of the single sleeve-valve. My invention relates to the operating mechanism for such a single sleeve-valve, and is intended to overcome some of the difficulties which have been encountered in previous operating mechanisms for such sleeve-valve.

In carrying out my invention in its preferred form I provide the sleeve-valve with a socket member of a ball-and-socket joint, with which socket member co-operates a ball member on the end of a pin which has a long bearing surface in a suitably driven rotatable member, the pin being arranged both to rotate and to slide longitudinally in said rotatable member as the latter rotates. The pin has an eccentric mounting in this rotatable member, and may be mounted either parallel to the axis of such rotatable member or oblique to such axis, the oblique mounting having certain advantages, which will appear later. The rotatable member is mounted in an eccentric bushing which is rotatably adjustable. This adjustable bushing serves a double purpose. It serves to adjust the driving gears to minimize back-lash due to wear or other causes. It also provides for the ready assembling and taking apart of the mechanism, by permitting a worm wheel on the rotable member to be adjusted toward and from the axis of its driving worm so that when adjusted away from such axis the worm wheel may readily be moved along its own axis laterally of the worm without interference therefrom.

The accompanying drawings illustrate my invention: Fig. 1 is a vertical central section through a single-sleeve-valve internal combustion engine embodying my invention, with the sleeve-operating pin oblique to the axis of the rotatable member which carries it; Fig. 2 is a partial side elevation of such engine, showing the mounting and spacing of the rotatable members for adjacent cylinders of a multi-cylinder engine; Fig. 3 is a horizontal section on the line 3—3 of Fig. 1, with the rotatable pin-carrying member rotated 90° from the position shown in Fig. 1, in order to show its turning action on the sleeve-valve; and Figs. 4 and 5 are fragmental views similar to parts of Figs. 1 and 2 respectively, showing the construction when the sleeve-operating pin is mounted in its rotatable member parallel to the axis of the latter.

The engine consists of a plurality of cylinders 10, in which pistons 11 are reciprocable. Each piston 11 is connected by a connecting-rod 12 to a crank on the crank-shaft 13, in any ordinary manner, the crank-shaft 13 being shown as offset from the axis of the cylinder 10 although that is not essential to my present invention. Between each piston 11 and its cylinder 10 is a sleeve-valve 15, which is both reciprocated axially and oscillated circumferentially in the cylinder 10 to produce the proper co-operation between the ports in the sleeve-valve and in the cylinder. I have not illustrated these ports in detail, but have merely shown one port 16 in the sleeve-valve and one port 17 in the cylinder, as such ports may be arranged in any desired manner; although one feature of my invention makes it possible to make such ports of greater circumferential extent, as will be explained later.

At its lower end, on one side, the sleeve-valve 15 is provided with the socket 20 of a ball-and-socket joint. This socket member 20 is shown in the drawings as integral with the sleeve-valve 15, but that construction is indicated merely for simplicity. The center of the spherical opening in the socket member 20 is desirably at a less distance from the inside of the sleeve-valve 15 than the radius of such sphere, which makes for an increase in the circumferential oscillation of the sleeve-valve for a given axial movement thereof, although this feature is not essential to the broader aspects of my invention. The use of a ball-and-socket joint makes it possible to get the center of the joint closer to the inner surface of the sleeve-valve than could be done if a bolt joint were used.

Within the socket member 20 is a ball member 21. This is a spherical segment of such width that it does not at any time project inward beyond the inside surface of the sleeve-valve 15, so that it permits the piston 11 to pass freely. If desired or necessary, that end of the segmental ball member 21 which is toward the center of the sleeve-valve 15 may be cut off obliquely at the sides, as is indicated in Figs. 1 and 3, to prevent it from projecting inward beyond the inner surface of the sleeve-valve.

The ball member 21 is fixed on the projecting end of a pin 22 which is the sleeve-operating pin. The pin 22 is desirably made separate from the ball member 21, and may have a screw mounting into the ball member as is indicated in Fig. 1, the opposite end of the pin from that which carries the ball then conveniently being prismatic in shape to receive a wrench, and the ball member having either a projecting pin 23 or a pair of spaced holes 24 for a suitable holding tool to hold the ball from turning. The pin 23, when provided, prevents the ball member 21 from rotating in the socket 20, such socket then being provided with a suitable slot 25 into which such pin 23 projects. The pin 22 may have an axial oil-hole 24' therethrough, for facilitating lubrication and breathing; but that is a mere incident.

The ball member 21 is separated from the pin 22 when being put into or taken out of the socket 20, and is turned so that its normally more or less vertical ends are substantially horizontal; and the outer part of the socket member 20 has notches 26 (Figs. 3 and 4) cut into it to permit the ball member to pass when thus turned.

The pin 22 for each cylinder has a long bearing in an eccentric hole 29 in a rotatable member 30 or 30' (Figs. 1 and 4 respectively). This member 30 or 30' desirably has its axis perpendicular to the axis of the associated cylinder 10 and sleeve-valve 15; and there is a series of these members 30 or 30', one for each cylinder, arranged along the side of the engine, above a worm-shaft 31 which extends parallel to the row of cylinders and to the crank-shaft 13 and is the common driving means for all the rotatable members 30 or 30'. The worm-shaft 31, which is thus the valve-operating shaft, is driven in any suitable way from the crank-shaft 13, a convenient drive being a chain-drive 32 such as is indicated in Fig. 2. The driving gearing from the worm-shaft to each rotatable member 30 or 30' comprises a worm wheel 33, preferably made of bronze, fixed to the rotatable member and intermeshing with a corresponding worm 34 on the common worm-shaft 31. The gear-ratios of the chain-drive 32 and of the worm gearing 33—34 are such that the rotatable member 30 or 30' rotates at half crank-shaft speed, so that it makes one complete rotation for four strokes of the piston 11, if the engine operates on the four-stroke cycle.

The worm wheel 33 is desirably a separate member from the rotatable member 30 or 30' on which it is mounted, but is keyed thereto so that the two rotate together. If the worm wheel is of bronze as I deem desirable, a thrust washer 35, usually of hardened steel, is desirably placed beside it and also keyed to the rotatable member.

The rotatable member 30 or 30' is rotatably mounted within a bushing 40, which bushing in turn is rotatably adjustable in a support in the crank-case 41 of the engine. The bushing has concentric external bearing surfaces at its two ends, the bearing surface at the inner end being smaller than the one at the outer end; and these are the bearing surfaces on which the bushing is adjustable in its mounting of the crank-case. The bushing also has internal bearing surfaces at its two ends, which two internal bearing surfaces are concentric with each other but eccentric with respect to the external bearing surfaces. Between the bearing surfaces at its two ends, the bushing 40 is cut away for part of its circumference to permit the worm wheel 33 and the worm 34 to mesh with each other. The inner end of the rotatable member 30 or 30' has a bearing in the internal bearing surface at the inner end of the bushing 40; and this inner end of the rotatable member is desirably slightly larger than the remainder thereof, to provide a shoulder against which the worm wheel 33 may bear, to position such worm wheel. In consequence, the outer end of the rotatable member 30 or 30' is smaller than the internal bearing surface at the outer end of the bushing 40; and the resultant space is occupied by an inward annular bearing extension 45 from a clamping plate 46 which overlies the outer end of the bushing 40 and projects outward beyond such bushing over the adjacent part of the crankcase. The inner and outer surfaces of the bearing extension 45 are concentric with each other, so that the inner bearing surface thereof will be concentric with the inner bearing surfaces of the bushing 40 but eccentric to the outer bearing surfaces thereof. The clamping plate 46 with its bearing extension 45 is clamped to the bushing 40 by a cap-screw 47, which extends through a hole in such plate into a threaded hole in such bushing, as is clear from Figs. 2, 3, and 5. Thus in use the plate 46 with its bearing extension 45 is rigid with the bushing 40, and the turning of one turns the other. The bearing extension 45 has a two-fold bearing: an internal bearing surface for the rotatable member 30 or 30'; and an end bearing surface for cooperating with the thrust washer 35. An end plate 48 is attached by a cap-screw 49 to the other end of the rotatable member 30 or 30' and overlies the plate 46 slightly to hold such rotatable member from moving inward with relation to such plate and to the bushing 40.

The bushing 40 and the clamping plate 46 with its bearing extension 45 may be turned circumferentially as a unit, to adjust the height of the rotatable member 30 or 30' by raising of the excentricity between the inner and outer bearing surfaces of such unit. This turning may be obtained readily by the insertion of a rod in radial holes 50 provided in the plate 46. The clamping plates are clamped in adjusted position by cap-screws 51 and washers 52, which cap-screws project into the crank-case in position so that the washers thereon overlap the plates 46. At intermediate points in the series of plates 46, each washer 52 overlaps two adjacent plates 46; but at the end of the series, where the cap-screws are adjacent to only one clamping plate, a special angle-washer 53 is provided which co-operates with two cap-screws, overlaps the plate 46 on one side of such cap-screws, and has a down-turned flange bearing against the crank-case on the other side of such cap-screws as is clear from Fig. 2.

A cover plate 55 may be provided to cover the entire series of clamping plates 46, cap-screws 47, end plates 48, cap-screws 49, cap-screws 51 and washers 52, and may be attached in place in any usual way. This cover plate 55 is left off in Figs. 2 and 5, in order to show the parts which such cover plate would conceal.

The rotatable member 30 or 30' with its worm wheel 33 and thrust washer 35 is mounted in the bearing extension 45 of the plate 46 while the latter is separated from the crank-case and desirably before the rotatable member is associated with the bushing 40; and the plate 48 and cap screw are then attached. This sub-unit may thus be assembled and inspected at the bench. This complete sub-unit is inserted into the bushing 40, and the bushing 40 and clamping plate 46 are fastened together by the cap-screw 47; and this is desirably also done at the bench. These parts together make a complete unit or sub-assembly, which can be put together, inspected and tested at the bench, apart from the engine. After this unit is thus assembled and adjusted at the bench, it rarely has to be taken apart, and remains as a unit throughout the remainder of the assembly and throughout the life of the engine.

In the meantime, the ball 21 with its pin 22 has been separately associated with the socket member 20 of the sleeve-valve 15.

Then the complete assembled unit including the rotatable member 30 or 30' is put in place in the opening provided for it in the crank-case 41, care being taken that the pin 22 is received in the eccentric hole 29 provided for it in the rotatable member as the latter and its associated parts is inserted into place.

(If desired, the bushing 40 may be inserted separately into the crank-case, and the rest of such unit inserted subsequently into the bushing; but I prefer to assemble the complete unit separately and insert it in its entirety.)

During the insertion of the rotatable member 30 or 30', whether or not the bushing 40 is then in place in the crank-case or in place on the rotatable member, the bushing is so turned with relation to the crank-case that the eccentric internal bearing surfaces of the bushing are at substantially their highest point. This is sufficiently high so that the worm wheel 33 may slide on its axis over the worm 34 without interference therewith on account of the curved teeth of the worm wheel. After the worm wheel 33 is in place over the worm 34, the bushing-unit, comprising the bushing 40 with its clamping plate 46 and the bearing extension 45 thereof, is turned by a suitable rod in one of the holes 50, to lower the eccentric internal bearing surfaces of such bushing-unit, and thereby to lower the rotatable member 30 or 30' and the worm wheel 33, so that such worm wheel is drawn into proper mesh with the worm 34 on the worm-shaft 31. By this turning of the bushing unit, exact meshing may be obtained to prevent undue backlash, both in the initial assembling and in order to compensate for wear. The bushing-unit is held in its adjusted circumferential position by the cap-screws 51.

To remove the rotatable member 30 or 30', the cap-screws 51 are removed which attach in place the unit containing that rotatable member; and then the bushing-unit comprising the bushing 40 and plate 46 is turned in the proper direction to raise the eccentric internal bearing surfaces thereof and thus to raise the rotatable member of such unit. In this way, the rotatable unit may be raised sufficiently high, as it was during insertion, so that it and the worm wheel 33 thereon may be moved along their own axis clear of the worm 34, which permits the unit as a whole to be drawn laterally out of its position in the crank-case.

This construction greatly facilitates assembly and removal of the parts; facilitates adjustment for wear and for inaccuracies in machining; and increases interchangeability.

In operation, the crank-shaft 13 drives the worm-shaft 31, which in turn drives the various rotatable members 30 or 30', which are properly timed for their respective cylinders. Each rotatable member carries its eccentric pin 22 around with it, and the pin acts through its ball-and-socket joint with the associated sleeve-valve 15 both to reciprocate the latter axially and oscillate it circumferentially, in a closed path. The pin 22 slides in and out in its eccentric hole 29 in the rotatable member, as required by the curvilinear oscillation of the sleeve-valve about its axis. Desirably the pin 22 does not turn on its own axis as the rotatable member rotates, so that the wear will be on the long bearing surface of the pin 22 in its hole 29 and not on the relatively small surfaces of the ball-and-socket joint 20—21; which makes for longer life. This may be accomplished by the pin 23 in cooperation with its slot in the socket member 20. However, the pin 23 may be omitted, as in Fig. 4, and the pin 22 and ball 21 allowed to "float", rotatable in both the socket 20 and in the hole 29.

Thus far the description has applied equally to the construction of Figs. 1, 2, and 3 and to the construction of Figs. 4 and 5. Both constructions embody my invention in certain aspects. However, there is a difference between the two constructions, and this difference is also one of the features of my invention, although not essential to certain aspects thereof.

This difference consists in the nature of the mounting of the sleeve-operating pin 22 in the rotatable member 30 or 30'. In the construction shown in Figs. 4 and 5, the pin 22 lies parallel to the axis of the rotatable member 30'; while in the construction shown in Figs. 1, 2, and 3, such pin 22 is oblique to such axis of the rotatable member 30.

There are a number of advantages in having the pin 22 oblique to such axis. This is evident from a comparison of Figs. 1 and 2 respectively with Figs. 4 and 5. In both constructions, the vertical movement of the center of the ball member 21 is the same. In other words, when the center of the ball member 21 is at the high point and the low point of its travel, the eccentricity with respect to the axis of the member 30 of Fig. 1 is the same as the eccentricity with respect to the axis of the member 30' of Fig. 4. However, this eccentricity remains the same during the entire cycle of rotation in the construction shown in Figs. 4 and 5, with the pin 22 parallel to the axis of the rotatable member 30'. It does not remain the same, however, when the pin 22 is oblique to the axis of the rotatable member 30, as in the construction shown in Figs. 1, 2, and 3; because as the rotatable member turns to bring the center of the ball member 21 into the same horizontal plane with the axis of the rotatable member 30, the resultant turning of the sleeve-valve 15 causes such center of the ball member 21 to travel around the axis of the sleeve-valve 15 and of the cylinder 10, which means that the pin 22 is drawn out of its hole in the rotatable member 30. A similar drawing out of the pin from the hole occurs in the parallel mounting of such pin 22 in the construction shown in Figs. 4 and 5 but that does not vary the eccentricity of the ball member 21; whereas when the pin 22 is oblique, as in Fig. 1, such drawing out of the pin causes the ball member 21 to be moved farther away from the axis of the rotatable member 30, as is clear from Fig. 3. As a result of this increased eccentricity of the ball member 21 as it approaches the horizontal plane of the rotatable member 30, the extent of circumferential oscillation of the sleeve-valve 15 about its axis is correspondingly increased. This increase in circumferential oscillation of the sleeve-valve 15 for a given axial reciprocation thereof makes it possible to make the ports in the sleeve-valve and cylinder wider and therefore larger, than is possible with the construction shown in Figs. 4 and 5 (with the parallel mounting of the pin 22), assuming a given vertical height of axial reciprocation of such a sleeve-valve for both cases.

Thus the oblique mounting of the pin 22 has a very definite advantage in increasing the area of the ports for a given hight of axial reciprocation of the sleeve-valve.

Further, in addtion to this benefit in obtaining increased port area, the oblique mounting of the pin 22 makes it possible to reduce the size of the rotatable member 30, of the bushing 40, and of the worm wheel 33 and the parts associated therewith. Because of this reduction in size of the rotatable member 30 and the parts associated therewith, the plate 46 may be correspondingly reduced in size; and therefore the center-to-center distance between adjacent plates 46 may be reduced, as is evident from a comparison of Figs. 2 and 5. This results not only in a saving in such plates themselves, but makes it possible to place the cylinders 10 closer together, thus effecting a saving in length of the engine, in the length of the crank-shaft, and in the distance between the bearings of the crank-shaft. With the oblique-pin construction shown in Figs. 1, 2, and 3, the cylinders 10 may be placed as close together as it is possible to get them with the proportions shown in Figs. 1, 2, and 3; whereas with the parallel-pin arrangement of Figs. 4 and 5, the spacing between adjacent cylinders 10 must be increased over this minimum, because of the necessary size of the plates 46 and the parts with which they are associated. This makes the oblique-pin construction of advantage in the construction of the entire engine, with a saving of considerable space and material.

I claim as my invention:

1. In an internal combustion engine, the combination of a cylinder, a piston, a sleeve-valve arranged to have both axial reciprocation and circumferential oscillation, a rotatable member having its axis transverse to the axis of the sleeve-valve, a pin having an eccentric slidable and rotatable mounting in said rotatable member, and a universal joint connection between said pin and said sleeve-valve, the axis of said pin being oblique to that of said rotatable member.

2. In an internal combustion engine, the combination of a cylinder, a piston, a sleeve-valve arranged to have both axial reciprocation and circumferential oscillation, a rotatable member having its axis transverse to the axis of the sleeve-valve, a pin having an eccentric slidable mounting in said rotatable member, and a universal joint connection between said pin and said sleeve-valve, the axis of said pin being oblique to that of said rotatable member.

3. In an internal combustion engine, the combination of a cylinder, a piston, a sleeve-valve arranged to have both axial reciprocation and circumferential oscillation, a rotatable member having its axis transverse to the axis of the sleeve-valve, a pin having an eccentric slidable and rotatable mounting in said rotatable member, a ball on said pin, and a socket on said sleeve-valve and co-operating with said ball, the axis of said pin being oblique to that of said rotatable member.

4. In an internal combustion engine, the combination of a cylinder, a piston, a sleeve-valve arranged to have both axial reciprocation and circumferential oscillation, a rotatable member having its axis transverse to the axis of the sleeve-valve, a pin having an eccentric slidable mounting in said rotatable member, a ball on said pin, and a socket on said sleeve valve and co-operating with said ball, the axis of said pin being oblique to that of said rotatable member.

In witness whereof, I have hereunto set my hand at Indianapolis, Indiana, this 15th day of April, A. D. one thousand nine hundred and twenty-six.

JULES HALTENBERGER.